United States Patent [19]

Resch et al.

[11] Patent Number: 4,629,258

[45] Date of Patent: Dec. 16, 1986

[54] HYDRAULIC DUAL CIRCUIT BRAKE SYSTEM FOR ROAD VEHICLES

[75] Inventors: Reinhard Resch, Stuttgart; Hellmut Krohn, Esslingen, both of Fed. Rep. of Germany

[73] Assignee: Daimler-Benz Aktiengesellschaft, Stuttgart, Fed. Rep. of Germany

[21] Appl. No.: 686,477

[22] Filed: Dec. 26, 1984

[30] Foreign Application Priority Data

Dec. 30, 1983 [DE] Fed. Rep. of Germany ....... 3347618

[51] Int. Cl.⁴ ............................................... B60T 17/18
[52] U.S. Cl. ....................................... 303/92; 303/114
[58] Field of Search .................. 303/92, 103, 110, 114

[56] References Cited

U.S. PATENT DOCUMENTS

| 4,478,461 | 10/1984 | Leiber | 303/92 |
| 4,523,791 | 6/1985 | Belart et al. | 303/92 |

*Primary Examiner*—Duane A. Reger
*Attorney, Agent, or Firm*—Barnes & Thornburg

[57] ABSTRACT

A hydraulically power-assisted dual circuit brake system for road vehicles combined with an anti-locking brake system has a stepped tandem master cylinder and a primary piston. The primary piston includes a ring piston which is displaceable in a larger cylinder step and a plunger which is displaceable in said ring piston. A pre-pressure acting on the control area of the plunger of the primary piston is built up by pedal actuation of a further plunger. This pre-pressure operates as a reference pressure and is also coupled into a proportional control valve. The proportional control valve provides a control output pressure which is taken from the auxiliary pressure source and is higher. The control output pressure is used to impinge the ring piston and thereby move the plunger of the primary piston. With use of the ABS control, at least a secondary brake circuit, in a special design a primary brake circuit as well, is switched over from static to dynamic operation. In dynamic operation, the output pressure of the proportional control valve is used to operate the selected brake circuit. A stroke sensor monitoring the displacement stroke of the ring piston generates an output signal independently of the ABS control, which signal triggers the changeover of both brake circuits to dynamic operation when a threshold value of the ring piston stroke is reached.

22 Claims, 4 Drawing Figures

HYDRAULIC DUAL CIRCUIT BRAKE SYSTEM FOR ROAD VEHICLES

BACKGROUND AND SUMMARY OF THE INVENTION

The invention relates to a hydraulic dual circuit brake system for road vehicles, and particularly to an anti-locking brake system that operates with hydraulic power assistance.

Anti-locking brake systems of this type are required in particular for heavy and powerful passenger vehicles in the upper power and comfort range in order to be able to achieve the high braking decelerations needed for safe driving. According to the statutory regulations, they must further be designed such that, minimum braking of the vehicle of 0.3 is still achievable with a pedal force of maximum 500N in the event of a failure of the power assistance. Furthermore, it is also necessary for safety reasons that the reaction forces occurring on the brake pedal provide the driver with a reliable response indicating the functional state of the brake system, whether it is in normal operation or whether it is with the anti-locking brake system (ABS) control active, and thereby signals to the driver that a braking operation is taking place in a situation of potential danger.

A brake system of the type stated at the start is known from German Unexamined Published Patent Application No. 3,110,028. In this known brake system, the brake circuit assigned to the primary output pressure chamber of a tandem master cylinder is dynamically operated (i.e. it admits the output pressure of the auxiliary pressure source) and the other brake circuit is connected to the secondary output pressure chamber of the tandem master cylinder which chamber is bounded by a floating spool and is statically operated. The floating spool is impinged by the output pressure of the auxiliary pressure source which is coupled into the primary output pressure chamber of the tandem master cylinder. The primary piston of the tandem master cylinder is impinged from both sides by the output pressure of the auxiliary pressure source and can therefore also be displaced without reaction force by the brake pedal as long as the auxiliary pressure source does not fail. In the event of a failure of the auxiliary pressure source, the tandem master cylinder operates like a conventional pedal-operated master brake cylinder. In normal operation (i.e. with operative auxiliary pressure source) the important response for the driver, indicating the brake force introduced, is achieved by means of a displacement simulator. The displacement simulator couples an output pressure proportional to the pedal force into the dynamically controlled brake circuit for controlling the proportional control valve.

One of the disadvantages of this known brake system is that, although the pedal restoring force generated by the displacement simulator is correlated with a certain pedal travel, it is not, however, correlated with the quantity of brake fluid actually taken up by the wheel brakes. Such a quantity of brake-fluid can be affected differently depending on the degree of bleeding of the brakes and/or as a consequence of a vapour lock. Another disadvantage is that if the pressure source fails (i.e. if both brake circuits are operated statically) high pedal forces are required in order to achieve an adequate brake deceleration.

Although these disadvantages have been reduced in a further known power-assisted brake system of a similar type (SAE Technical Paper Series 830483, March 1983) to such an extent that, in this brake system, if the auxiliary pressure source fails, a mechanical pedal force transmission becomes effective, which in this system favors the brake force development in the front axle brake circuit. A failure of the auxiliary pressure source is, however, always associated with a failure of the dynamically operated rear axle brake circuit, with the consequence that the maximum braking effect physically achievable is markedly reduced.

One object of the present invention is therefore to create a brake system of the type stated at the start which provides the driver with reliable information on the functional state of the brake system via the reactional behavior of the brake pedal and, in the statistically significant cases of malfunction, in particular in the event of a failure of the auxiliary pressure source, make it possible to achieve a high braking deceleration at favorably low pedal forces.

Hereafter, as long as the ABS control is not in operation, both brake circuits are statically operated and the reaction behavior of the brake pedal is the same as in the case of direct pedal actuation of the primary piston of a tandem master cylinder. The present invention provides transmission of the pedal force in the event of a failure of the power assistance caused by different values of the effective cross-section of the primary piston with or without power assistance. A clear transmission of the pedal force becomes effective since the pressure build-up in the primary output pressure chamber of the tandem master cylinder is brought about by displacement of a plunger in the present invention. This plunger is designed as a part of the primary piston, the cross-section of which is less than that of the primary piston effective in power assistance. Although there is an extension to the pedal travel if the auxiliary pressure source fails since the maximum available displacement stroke of the primary piston in a failure of the auxiliary pressure source reaches from the basic position to the striking position of the primary piston against the secondary piston, which for its part runs up against the end face of the cylinder casing. High brake pressures and correspondingly high brake decelerations far in excess of the statutory minimum requirements can none the less be achieved in the event of a failure of the auxiliary pressure source. In the case of activation of the ABS control, the brake pedal becomes as it were "hard," so that the driver also obtains a clear response via the brake pedal for this operational state of the brake system.

The features of the present invention also include alternative or combinational possibilities for the appropriate change-over or selection of one or both brake circuits of the brake system according to the present invention to dynamic operation when the ABS control is activated. The result of this is that a minimum quantity of brake fluid is always kept enclosed in the output pressure chambers of the tandem master cylinder. This minimum quantity of brake fluid can be utilized to provide braking with good deceleration still if the auxiliary pressure source fails.

In practical application of other features of the present invention, the driver can determine from the reaction behavior of the brake pedal whether the ABS control has become active.

The pedal-dependent or piston stroke-dependent change-over of the brake system from static to dynamic operation, in accordance with other aspects of the present invention, provides an additional operational reliability in the case where the ABS control responds in a brake situation in which the coefficients of friction effective between the highway, and the braked vehicle wheels are subjected to drastic fluctuations and the auxiliary pressure supply simultaneously fails.

The present invention also includes means for monitoring the pedal position and the piston positions of suitable displacement sensors, an appropriate processing of the displacement sensors and output signals can be used to achieve important monitoring functions concerning the operational state of the tandem master cylinder of the brake system.

A malfunction of the brake system resulting from a leak in the piston packing provided for sealing the primary piston from working pressure chambers of the tandem master cylinder can be avoided by means of a safety valve included in one embodiment of the present invention.

The present invention also includes working versions of the brake system and its anti-locking system utilizing the return feed principle and viable with low technical effort and advantageous in particular for an integrated design of the brake system and its anti-locking system.

The present invention also includes means for controlling of the change-over of the primary brake circuit to alternating dynamic and static pressure admission provided in Claim 16 for the case where the ABS is operative provides a pulsing of the brake pedal, significant for the operation of the control, as long as the pedal travel covered before activation of the control is not greater than a specified limit.

Further objects, features, and advantages of the present invention will become more apparent from the following description when taken with the accompanying drawings which show, for purpose of illustration only, an embodiment in accordance with the present invention.

DETAILED DESCRIPTION OF THE DRAWINGS

Figure 1:
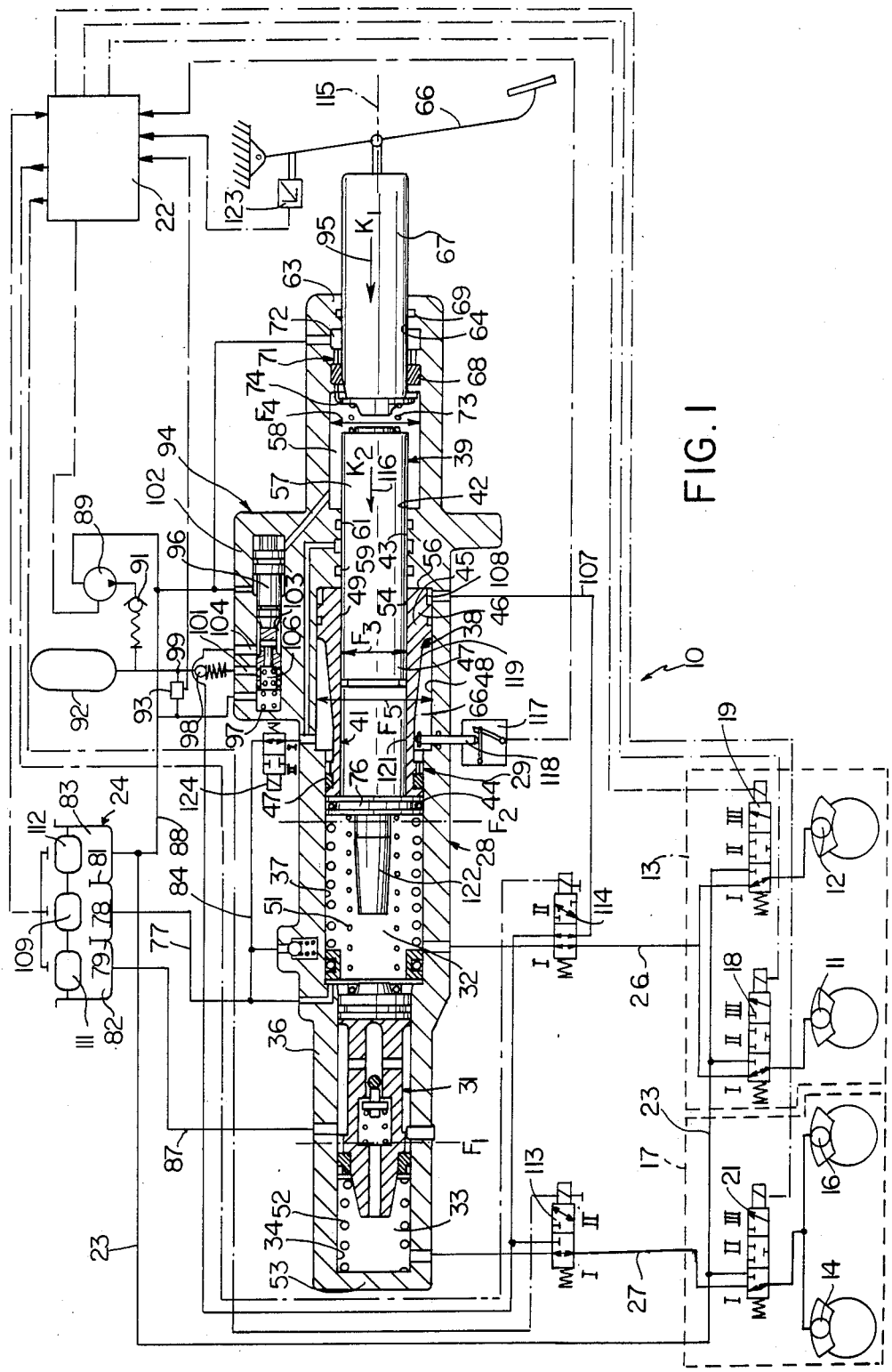
FIG. 1 is a simplified block circuit diagram of a first exemplary embodiment of a brake system according to the present invention wherein change-over of the brake circuit to dynamic operation is dependent on activation of the ABS control and on the pedal and piston positions.

The hydraulic brake system 10 according to the invention, with integrated anti-locking brake system (ABS), represented in FIG. 1 and to the details of which attention is expressly drawn, is designed as a dual circuit brake system, it being assumed that without restricting the generality (i.e. merely for the purposes of explanation) that the front wheel brakes 11 and 12 are combined in a front axle brake circuit 13 and are subjected to a single-wheel control with respect to the anti-locking control, and that the rear wheel brakes 14 and 16 are combined into a rear axle brake circuit 17 and are subjected to a common control with respect to the anti-locking control. It will be assumed that the basic design and function of the anti-locking brake system is known, the brake pressure control valves for example being designed as 3/3 way solenoid valves, which can be controlled by means of output signals of an electronic control unit 22, in a sequence and combination corresponding to the control purpose of the ABS, from a pressure build-up position corresponding to their basic position (I) into alternative pressure maintaining positions (II) and pressure reduction positions (III). It is further assumed in the exemplary embodiment according to FIG. 1 that the ABS operates on the flow-off principle. Under this principle, the wheel brakes 11 and 12 or 14 and 16, which are controlled by means of the individual brake pressure control valves 18 and 19 or 21, are connected via a return line 23 to the brake fluid reservoir 24 in the pressure reduction positions III of these valves.

Figure 2:
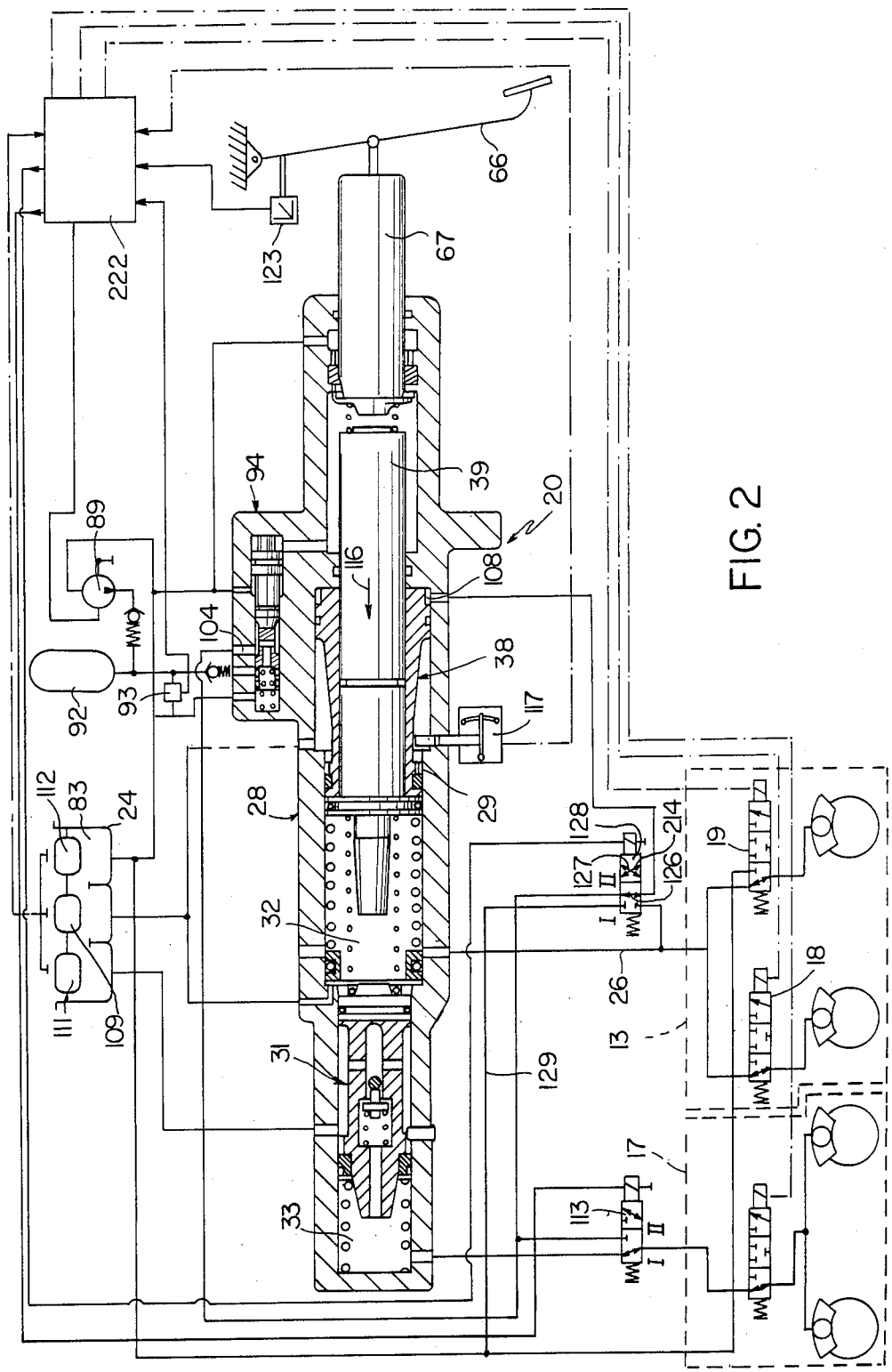
FIG. 2 is a diagrammatic view of another exemplary embodiment of a brake system according to the present invention having pedal-monitored and piston stroke-monitored control of the change-over of the brake circuits to dynamic operation.
Figure 3:
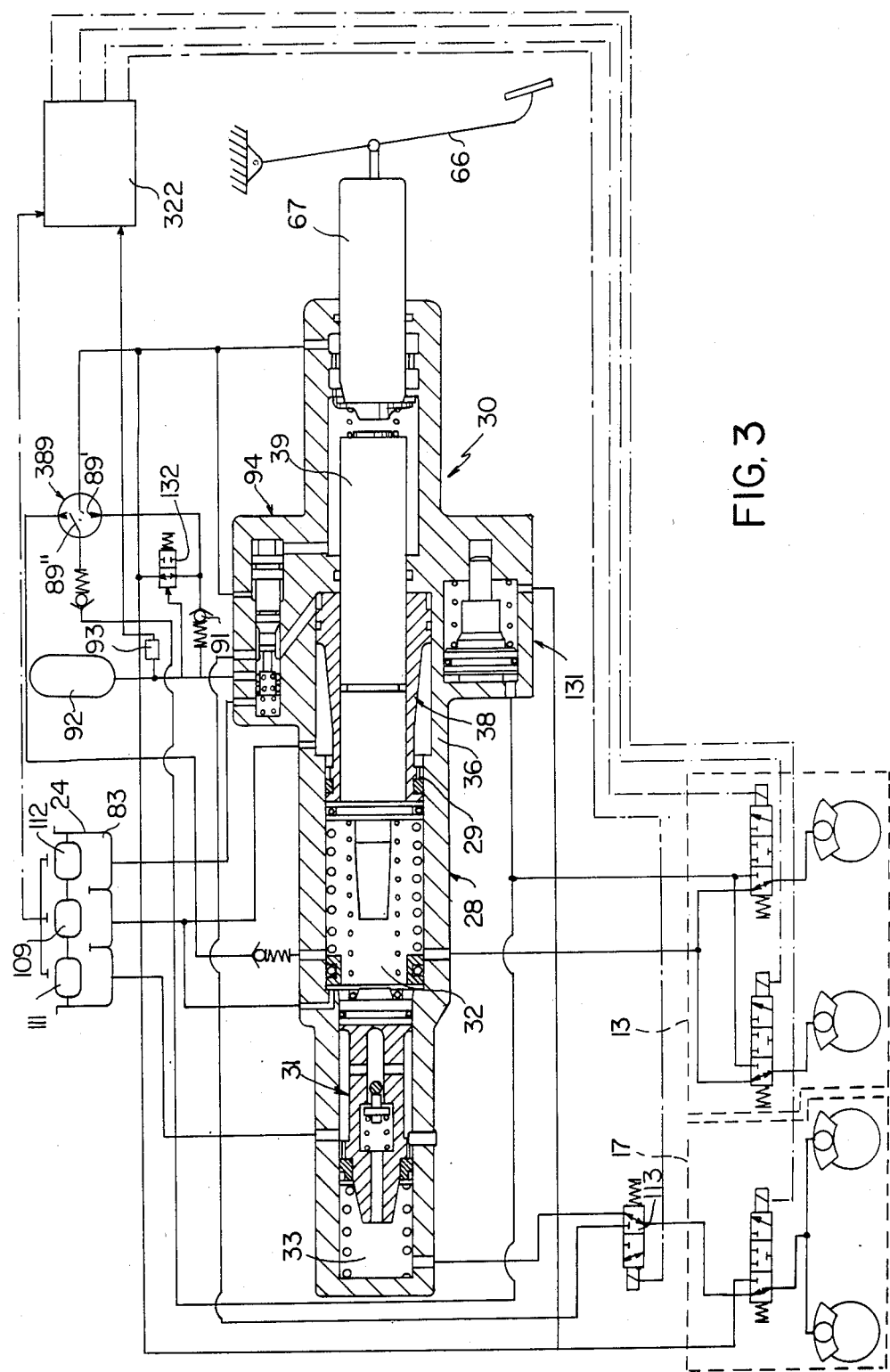
FIG. 3 is a diagrammatic view of yet another exemplary embodiment of brake systems according to the invention with ABS control operating in a brake circuit based on the return feed principle.
Figure 4:
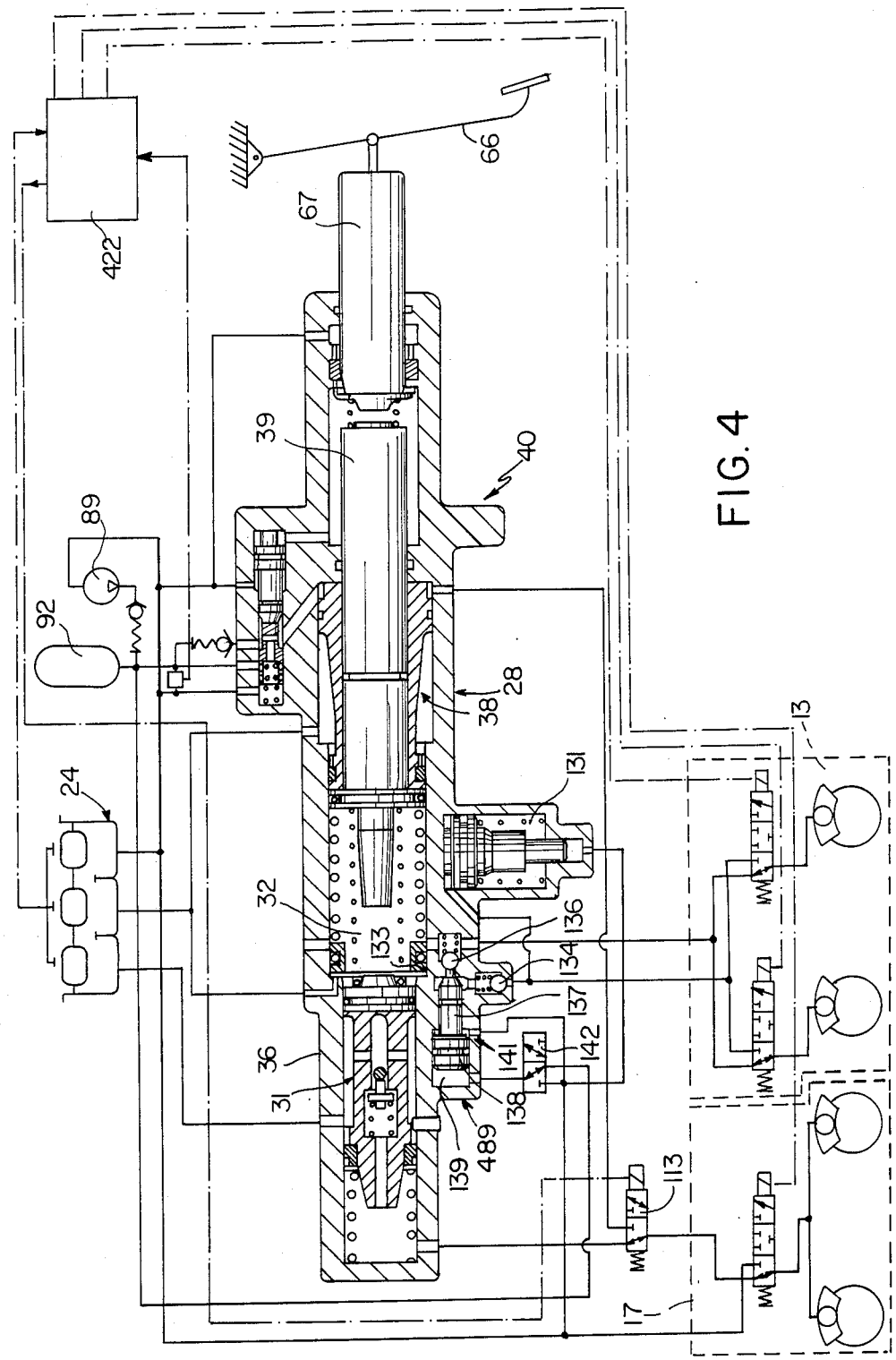
FIG. 4 is a diagrammatic view of yet another exemplary embodiment of brake systems according to the invention with ABS control operating in a brake circuit based on the return feed principle.

A precautionary note should be made here that the connection of all brake pressure control valves 18, 19 and 21 to a common return line 23 is provided only in the case of the exemplary embodiments according to FIGS. 1 and 2, whereas in the embodiments according to FIGS. 3 and 4, in which the ABS control operates in the primary brake circuit 13, 32 on the return feed principle, only the secondary brake circuit 17 is connected to the return line 23.

A tandem master cylinder 28 which can be actuated with hydraulic power assistance is provided for generation of the brake pressures $P_{VA}$ and $P_{HA}$ coupled in "normal" braking into the front axle brake circuit 13 or the rear axle brake circuit 17 via brake lines 26 and 27. The tandem master cylinder 28 includes a primary output pressure chamber 32 which is assigned to the front axle brake circuit 13 and is bounded in the axial direction on one side by the primary piston generally denoted by 29 and on the other side by the floating spool 31. The tandem master cylinder 28 also includes a secondary output pressure chamber 33 which is bounded on one side by the floating spool 31 and is assigned to the rear axle brake circuit 17.

The tandem master cylinder is designed as a stepped cylinder as can be seen in detail from FIG. 1, and the bore stage 34 of the cylinder casing 36 radially bounds the secondary output pressure chamber 33 of the tandem master cylinder and has a smaller cross-sectional area $F_1$ than the spatially larger bore stage 37 of the cylinder casing 36. The bore stage 37 radially bounds the primary output pressure chamber 32 for the greater part of its length and has a cross-sectional area which is denoted by $F_2$. A transmission of the output pressure reached in the secondary circuit 17 in the ratio $F_2/F_1$, and thus a correspondingly increased braking effect in the rear axle brake circuit 17, is achieved in the event of a failure of the front axle brake circuit 13 as the result of damage due to the thus far described design of the tandem master cylinder 28 as a stepped cylinder.

The primary piston 29 of the tandem master cylinder 28 is of two-piece design. It comprises a ring piston 38 and an elongated-cylindrical plunger 39. The plunger 39 is guided in an axially displaceable pressure-tight manner in a central bore 41 of the ring piston 38 and in a central bore 42, flush to the latter, of an internal bulkhead 43 of the cylinder casing 36. The plunger 39 has a clearly smaller diameter and a clearly smaller cross-sectional area $F_3$ than the bore stage 37 bounding the primary output pressure chamber 32. The ring piston 38 has two end flanges 44 and 46, arranged at an axial distance from each other and joined together by means of an adaptor 45 which is conical on the outside. With its one end flange 44, on the left in FIG. 1, the ring piston 38 is guided in the bore stage 37 of the cylinder casing 36 to define one boundary of the primary output pressure chamber 32, and is sealed off from the casing by means of a ring gasket 47. With its other end flange 46, on the right in FIG. 1, the ring piston 38 is guided in a third bore stage 48 of the cylinder casing and sealed off from the latter likewise by means of a ring gasket 49.

The primary piston 29 and the secondary piston 31 are supported against each other in the usual way by pre-tensioned pneumatic helical springs 51 and 52 as on the face wall 53 of the cylinder casing 36 bounding on one side the secondary output pressure chamber 33. In its unloaded condition, the pistons are pushed by these springs 51 and 52 into the basic position shown in FIG. 1. In such a case, the ring piston 38 is biased via a short neck 54 against the one annular bounding surface 56 of the partition 42. The outside diameter of the short neck 54 is smaller than the diameter of the third bore stage 48 of the cylinder casing 36, and the plunger 39 projects into a pre-pressure chamber 58 and includes a free end section 57, the length of which corresponds approximately to the maximum displacement stroke of the plunger 39. The pre-pressure chamber 58 is sealed off from the third bore stage 48 of the cylinder casing 36 by means of two ring gaskets 59 and 61, which are arranged in annular grooves of the partition bore 42 through which the plunger 39 passes. The cross-sectional area $F_4$ of the pre-pressure chamber 58 is somewhat larger than that of the plunger 39.

An end face wall 63 of the cylinder casing 36, which closes off the same, has a central bore 64 flush with the central bore 42 of the partition 43. An axially displaceable plunger 67 is guided in bore 64 by actuation of the brake pedal 66. The plunger 67 is sealed off from the pre-pressure chamber 58 by means of a lip collar 68 and from the outside surroundings by means of a ring gasket 69.

The lip collar 68 is part of a follower device, generally denoted by 71, via which brake fluid can flow on from an annular groove 72 following introduction of brake fluid into the pre-pressure chamber, due, for example, to a rapid retraction movement of the plunger 67. The follower device 71 is arranged between the lip collar and the sealing ring 69 and is communicatingly joined to the reservoir 24.

The plunger 67, simultaneously acting as a ram, is biased by means of a pre-tensioned pneumatic helical spring 73 against the plunger 39 of the primary piston 29. The spring 73 pushes the plunger 67 into its basic position which is marked by the position of a contact disc 74 on the inside of the end face wall 63 of the cylinder casing 36. The basic position of the plunger 39 is determined for its part by the position of its striking or driving flange 76 on the face of the larger ring flange 44 of the ring piston 38.

The primary circuit 13, 32 and the secondary circuit 17, 33 of the brake system 10 are provided with compensating devices, the design and function of which are known, via which brake fluid can flow on in the basic position of the primary piston 29 and/or of the secondary piston 31 from the reservoir 24 into the respective brake circuit, or overflow from this circuit back into the reservoir, as well as with follower devices, via which brake fluid can be delivered from the reservoir 24 into the primary output pressure chamber 32 or the secondary output pressure chamber 33 of the tandem master cylinder 28, even in advanced positions of the primary piston 29 and/or of the secondary piston 31 associated with braking, e.g., by means of forward and backward movements of the cylinder pistons 29 and 31 induced by many repeated "pump movements" of the brake pedal 66.

A first compensating and following flow path 77, assigned to the primary circuit 13, 32, and via which all compensating and following brake fluid flows occurring in the primary circuit 13, 32 of the brake system 10 pass, is connected to a first chamber 78 of the reservoir 24. The first chamber 78 is separated from a second chamber 82 and a third chamber 83 of the reservoir 24 by means of partitions 79 and 81. This first chamber 78 of the reservoir 24 also has a compensating branch 84 connected to it, via which brake fluid can flow on into the annular chamber 86 bounded in axial direction by the piston flanges 44 and 46 of the ring piston 38 within the cylinder casing 36 or can flow back from this chamber to the reservoir 24 through valve 24.

From the second chamber 82 of the reservoir 24, a second compensating and following flow path 87 leaves, via which all compensating and following brake fluid flows occurring in the secondary circuit 17, 33 of the brake system 10 pass.

Connected to the third chamber 83 is the return line 23 of the anti-lock brake system. From the third chamber 83, a brake fluid line 88 runs to the intake side of a preferably electrically driven hydraulic pump 89, with which a pressure accumulator 92 is chargeable by means of a non-return 91, operated in the passage direction by high output pressure of the pump. The accumulator pressure can be monitored in the usual way by means of a pressure switch 93, which, if the brake fluid pressure in the pressure accumulator drops below a lower threshold considered to be tolerable, emits a signal characteristic of this state to the electronic control unit 22, which thereupon generates a signal for the triggering of the hydraulic pump 89 in its charge operation. It is expedient if, instead of a pressure switch simply designed as a threshold sensor, a pressure sensor is provided which generates an output signal proportional to the accumulator pressure, so that the comparison of its output signal with comparative values which can be specified by the electronic control unit can also be used for initiating other control functions, e.g., the triggering of safety devices. The accumulator 92, together with its charge and monitoring device 89, 93, form an auxiliary pressure source with, for example, a defined high output pressure of 160 to 180 bar, from which a control pressure $P_S$, which can be utilized for boosting brake power, is drawn off by means of a proportional control valve structurally integrated in the tandem master cylinder 28 and generally denoted by 94. The control pressure $P_S$ is proportional to the pressure P generated by foot-powered actuation of the brake pedal 66 and the resultant displacement of the plunger 67 in the direction of arrow 95 in the pre-pressure chamber 58 of the tandem master cylinder 28, and is at a clearly higher level than the pre-pressure $P_P$.

The function of the proportional control valve 94, which can take very many possible structural forms, is briefly explained below:

A slide valve 96 is moved, by the pressure $P_p$ building up in the pre-pressure chamber 58 upon actuation of the brake pedal 66, against the action of a restoring spring 97 until the input channel 101, connected to the pressure output 99 of the auxiliary pressure source via a non-return valve 98, communicates with the control pressure output 104 via an annular chamber 103 bounded by the slide valve 96 within the valve housing 102 to cause the output pressure of the accumulator 92 to be briefly available at this output. At the same time, the accumulator pressure is admitted via a central channel of the slide valve 96 to a back-pressure chamber 106 of the proportional control valve 94, which causes the slide valve 96 to move again in the opposite direction, and the communicating connection between the high-pressure input 101 and the control pressure output 104 of the control valve 94 to be interrupted.

The continuous repetition of these control cycles results in the control pressure which settles at the midpoint in time at the control pressure output 104 being transmitted proportionally, and at a ratio determined by the design of the proportional control valve 94, to the pre-pressure generated by the pedal actuation.

The control output pressure $P_S$ can be coupled via a control channel 107 into the annular chamber 108 bounded in axial direction by the large piston flange 46 of the ring piston 38 and its opposite annular bounding surface 56 of the partition 43 of the cylinder casing 36, so that the ring piston 38 is now impinged by the control pressure $P_S$, on a ring area the size of which corresponds to the difference between the cross-sectional area $F_5$ of the third bore stage 48 of the cylinder casing 36 and the effective cross-sectional area $F_3$ of the plunger 57 of the primary piston 29. In the final analysis, the control pressure is proportional to the foot force with which the brake pedal 66 is actuated in braking.

The boost in brake power or power assistance achieved by this can be varied within wide limits by appropriate designing of the respective areas of the cylinder pistons 38, 39 and 67 and of the proportional control valve 94.

By monitoring the brake fluid filling level in the reservoir chambers 78, 82 and 83 by means of float-operated switches allocated to each one of these chambers and represented in each case by a float 109 or 111 or 112, it is determined whether a fault leading to an impermissibly high brake fluid consumption has occurred in the primary circuit 13, 32 in the secondary circuit 17, 33 and/or in the hydraulic power assistance circuit 89, 92.

A change-over valve 113, designed as a 3/2-way solenoid valve in operation links the functional hydraulic brake power assistance elements 92 and 94 with the ABS control circuit 18, 19, 21, 22. The secondary output pressure chamber 33 of the trandem master cylinder is communicatingly joined to the brake line 27 leading to the rear axle brake circuit 17 when the change-over valve 113 is in its basis position I. Brake line 27 does not have any communicating connection to the control pressure output 104. The rear axle brake circuit 17 is operated as a closed brake circuit in this position of the change-over valve 113, at least as long as the ABS does not become operative. On the other hand, the real axle brake circuit 17 is blocked off from the secondary output pressure chamber 33 of the tandem master cylinder when the change-over valve 113 is in its excited position II. Instead, the rear axle brake circuit 17 is communicatingly joined to the control pressure output 104 of the proportional control valve 94. The change-over valve 113 is instructed to move to its excited position II and remain there as long as there is an electrical output signal of the electronic control unit 22 indicating that the ABS is operative. An electrical control signal suitable for triggering the change-over valve 113 can, for example, be derived from an internal OR operation of the electrical output signals issued by the electronic control unit 22 of the ABS for triggering the brake pressure control valves 18, 19 and/or 21. However, in this case the change-over valve 113 is maintained for a minimum period in its excited position after the brake pressure control valve 21 has switched to its basic position, so that, the possibility is eliminated that the brake pedal 66 might be able to, as it were, "fail" once the ABS control has stopped if the ABS control has caused the wheel brakes 14 and 16 of the secondary brake circuit 17 to be, as it were, "controlled to empty".

In a preferred configuration of the control logic, the triggering of the change-over valve 113 can also be designed in such a way that it only changes over to dynamic operation if the ABS control is only active on the secondary brake circuit 17, this in turn being on the condition that the change-over valve 113 remains in its excited position II for the stated period after the control on the secondary brake circuit 17 has stopped.

The sub-unit of the brake system 10 according to FIG. 1 so far described, is present in all exemplary embodiments of brake systems according to the invention 10, 20, 30 and 40, shown in FIGS. 1 to 4, the other specific design details and functional characteristics of which are explained below, the same reference numbers being used in each case for elements of the same or analogous structure and function.

The brake system 10 according to FIG. 1 further comprises a second change-over valve 114, with which the front axle brake circuit 13 can be changed over from static admission (i.e. performed with the brake pressure $P_{VA}$ generated in the primary output pressure chamber 32 of the tandem master cylinder 28 upon braking) to dynamic pressure admission (i.e. performed with the output pressure of the proportional control valve 94) alone or in addition to the change-over of the rear axle brake circuit 17, 33.

This second change-over valve 114 is designed as a 4/2-way solenoid valve. When the second change-over valve 114 is in its basic position I, the control pressure output 104 of the proportional control valve 94 is communicatingly joined to the annular control pressure chamber 108, and the primary output pressure chamber 32 of the tandem master cylinder is communicatingly joined to the brake line 26 leading to the front axle brakes 11 and 12. In the excited position II of the second change-over valve 114, the primary output pressure chamber 32 of the tandem master cylinder 28 is blocked off from the brake line 26 of the front axle brake circuit 13 and, the control pressure output 104 of the proportional control valve 94 is communicatingly joined to the brake line 26 of the front axle brake circuit 13 and cut off from the annular control pressure chamber 108.

Triggering of the second change-over valve 114 into its excited position II can take place in the same way as described for the first change-over valve 113, namely for the same period in which the ABS is activated.

If the two change-over valves 113 and 114 are simultaneously controlled into their excited position II (i.e. with activation of the anti-locking brake system control the consequence is that the brake pedal 66 becomes, as it were, "hard" (i.e. increasing the pedal actuation force is no longer associated with any notable increase in pedal travel) as soon as a brake pressure control phase is initiated at one of the wheel brakes 11, 12, 14 and 16 due to the simultaneous blocking of the braking lines 26, 27 between the primary output pressure chamber 32 and the secondary output pressure chamber 33 of the tandem master cylinder 28 and the front axle brake circuit 13, 32 and the rear axle brake circuit 17, 33, respectively. However, an increase in the pedal actuation force continues to have the effect of an increase in the control pressure $P_S$, with which the wheel brakes 11, 12, 14 and 16 are impingeable in the control phases of the ABS.

There follows an explanation of the function of the brake system 10 described so far with reference to a number of braking situations to be regarded as relevant, the design of which is also to be outlined by means of functional data related to the control electronic control unit 22 and which one skilled in the art can produce on the basis of such functional data, using conventional technical means. Assuming faultless function of the brake system 10, it operates as follows in the case of "normal" braking (i.e. without activation of the ABS).

The actuation force $K_1$ transferred with pedal transmission to the ram plunger 67 and acting in the direction of arrow 95 has the effect that a pressure $P_p$ is built up in the pre-pressure chamber 58 which, ignoring the restoring force of spring 73, has the value $K_1/F_3'$ wherein $F_3'$ denotes the effective cross-sectional area of the ram plunger 67. This causes the plunger 39 of the primary piston 29 to be impinged by the force $K_2 = P_p \cdot F_3$ acting in the direction of arrow 116. The proportional control valve 94 gives off a control pressure $P_S$, the level of which is higher than the prepressure $P_p$ and, according to this level, lies between the output pressure of the accumulator 92 and of the prepressure $P_p$. Under the effect of the control pressure $P_S$ coupled in the annular control pressure chamber 108, the ring piston 38 is impinged with the force $K_3$ likewise acting in the direction of arrow 116, the level of which is given by the relation $$K_3 = (F_5 - F_3)P_S.$$

It is assumed here that the force $K_3$, with which the ring piston 38 is impinged, is of a higher level than the force $K_2$ which acts on the plunger 39. The plunger 39 of the primary piston 29 is then pushed overall by the force $K_4 = K_2 + K_3$ in the direction of arrow 116, the ring piston 38 being biased against the striking flange 76 of the plunger 39. The output pressure $P_{VA}$ building up in the primary output pressure chamber 32 then amounts to $K_4/K_2$, ignoring the effect of the restoring springs 37 and 51. Again ignoring the effect of the restoring spring 52, the same output pressure is built up in the secondary output pressure chamber 33 of the tandem master cylinder 28 assigned to the rear axle brake circuit 17. The brake pressures $P_{VA}$ and $P_{HA}$ coupled into the front axle brake circuit 13 and the rear axle brake circuit 17 are proportional in this case to the actuation travel of the brake pedal 66. If the ABS becomes operative, the two change-over valves 113 and 114, triggered by output signals of the electronic control unit 22, are instructed to move to their operative position II. This change-over can take place simultaneously, with the consequence that the brake pedal 66 becomes "hard" as soon as the ABS control becomes active at any of the vehicle brakes 11, 12, 14 or 16.

Triggering of change-over valves 113 or 114 can also be controlled in such a way that initially only one of the change-over valve 113 or 114 which corresponds to the brake circuit 17 or 13 under exclusive ABS control is changed over. In this type of triggering of the change-over valves 113 and 114, pedal travel-proportional brake pressure can continue to build up in the non-controlled brake circuit. In this case, the brake pedal 66 only become completely "hard" when the ABS control is activated on both brake circuits.

Depending on which type of pedal characteristic appears more appropriate as response on the functional state of the brake system 10, triggering of the change-over valves 113 and 114 can be accomplished in one way or another.

In the event of a failure of the power assistance, e.g., due to failure of the pressure accumulator 92 or its charge pump 89, detectable by an output signal of the pressure switch 93 characteristic of this, the control outputs assigned to the change-over valves 113 and 114 of the control electronics 22 are blocked, so that the change-over valves 113 and 114 remain in their basic position I and the output pressure chambers 33 and 32 of the tandem master cylinder 28 thus remain connected to the brake lines 27 and 26. The brake pressure build-up now takes place just by means of the displacement of the plunger 39 of the primary piston 29 under the effect of pedal force $K_1$ coupled in via the ram plunger 67. Due to the smaller cross-sectonal area $F_3$ of the plunger 39, in comparison with the cross-sectional area $F_2$ of the primary output pressure chamber 32, there arises a transmission with respect to the force effective for the pressure build-up in the primary output pressure chamber 32 and thus also in the secondary output pressure chamber 33 of the tandem master cylinder 28, at a ratio of $F_2/F_3$, so that favorably high brake pressures $P_{VA}$ and $P_{HA}$ are generated with corresponding pedal travel extension despite failure of the power assistance. A similar high braking of the vehicle can be achieved as in the case of intact power assistance with at most moderately increased pedal force.

If the power assistance has failed, then the ABS is switched off to avoid, for example, any "failure" of the brake pedal 66 as the result of a control to empty" of the brakes and their associated output pressure chambers 32 and/or 33 (i.e. a complete pressure drop in the course of several successive control cycles—pressure reduction and pressure build-up cycles).

In the event of a failure of the front axle brake circuit 13, 32 (e.g. due to a leak in the brake line 26) detectable by a response of the float-operated switch 109 assigned to the front axle brake circuit 13, then the change-over valve 114 is kept in the basic position so that the pressure accumulator 92 cannot drain empty via the faulty front axle brake circuit. The same applies analogously in the case of a failure of the rear axle brake circuit 17, 33. The ABS control can be maintained for whichever brake circuit 17, 33 or 13, 32 is still intact.

A further development of the brake system 10 provides for a displacement sensor 117, which emits an electrical output signal which is clearly correlated with various positions of the ring piston 38 of the primary piston 29 and supplied to the electronic control unit 22 as an information input signal. In a preferred configuration, this displacement sensor 117 generates an analogue voltage signal, the level of which constantly increases with increasing displacement of the piston 38 in the direction of arrow 116. It can, for example, be designed as a voltage divider, the divider ratio of which is constantly changed by axial displacement of a tappet 118, which is radially biased against the conical outer jacket surface 119 of the adaptor 45 joining together the two piston flanges 44 and 46 of the ring piston 38. If the output signal level of the displacement 117 exceeds a threshold value which can be specified or pre-determined within the scope of the electronic control unit 22, the unit generates output signals which are independent of an activation of the ABS control for instructing the two change-over valves 113 and 114 to move to operative positions II, and the output pressure chambers 32 and 33 of the tandem master cylinder are blocked from the brake lines 26 and 27. This ensures that, in the case of a failure of the auxiliary pressure source 89, 92, there is still always an adequate quantity of brake fluid available in the output pressure chambers 32 and 33 of the tandem master cylinder 28 in order to achieve a braking of the vehicle adequate to meet the statutory minimum requirements by actuation of the brake system 10 just under foot-power control.

If there were no displacement sensor 117 with the described function, the braking situation described below as an example could develop into a situation of considerable danger.

In a first phase of braking, in which the vehicle is travelling on a highway with a high coefficient of friction between the road surface and the braked vehicle wheels, the brake pedal 66 is pressed down under high pedal force, a considerable part of the brake fluid quantity contained in the output pressure chambers 32 and 33 of the tandem master cylinder is taken up by the wheel brake cylinders and the brake lines leading thereto, but the ABS control does not become active. The ABS control is activated as the vehicle now reaches an area of the carriageway with a low coefficient of friction while braking is still going on. The pressure reducing phases of the Anti-locking Brake System are able to last until the wheel brake cylinders and the output pressure chambers 32 and 33 of the tandem master cylinder have become practically pressureless. Should the pressure accumulator 92 fail in this situation (i.e. it itself becomes pressureless) if the vehicle then again reaches an area of the road with a high coefficient of friction, in which case the ABS control again becomes inoperative, no notable brake pressure can be built up any longer in the wheel brake cylinders. This is because there is no longer any "reserve quantity of brake fluid" available in the output pressure chambers 32 and 33 of the tandem master cylinder 28 which could be pushed into the brake circuits 13 and 17. Such a situation is reliably avoided in the case of brake system 10 by the piston stroke-dependent blocking of the output pressure chambers 32 and 33 of the tandem master cylinder 28.

In order to further safeguard operation of the brake system 10 appropriate for the situation, another displacement sensor 123 is provided with which the position of the brake pedal 66 can be monitored. This additional displacement sensor 123 generates voltage output signals which are passed on to the electronic control unit 22 as inputs. The level of these signals varies with the brake pedal position and is proportional to the expectation values of the brake force associated with various positions of the brake pedal 66. The output signal of the additional displacement sensor 123 is a direct measure for the displacement stroke of the ram plunger 67 and thus also for that of the plunger 39 of the primary piston 29. It is also an indirect measure for the displacement stroke of the ring piston 38 of the primary piston 29, provided that the displacement of the plunger 39 results from it being driven by the ring piston 38. The output signal of the displacement sensor 123 monitoring the pedal position can thus be used for appropriate triggering of the change-over valves 113 and 114 should the displacement sensor 117 directly monitoring the position of the ring piston 38 fail while the brake system 10 is otherwise completely ready to operate.

Furthermore, a processing of the position-information output signals of the two displacement sensors 117 and 123, carried out by the electronic control unit 22, could be used, for example, by comparison of these output signals with one another and/or with stored comparative values, to obtain at least the following monitoring functions:

One:
Sealing of the change-over valve 114 assigned to the front axle brake circuit 13, 32 in its excited position II,
A triggering of the change-over valve 114 into its excited position II is associated with an advanced position of the ring piston 38, relative to the basic position shown of the primary piston 29 and seen in the direction of arrow 116, irrespective of whether triggering of the change-over valve 114 has occurred due to activation of the ABS control or due to the attainment of the maximum displacment stroke of the ring piston 38. Assuming proper operation of the brake system 12 and maintenance of the actuation force acting on the brake pedal 66, the ring piston 38 remains in the position adopted upon triggering of the change-over valve 114, since brake fluid can subsequently escape neither from the output pressure chambers 32 and 33 of the tandem master cylinder 28 nor from the control pressure chamber 108 of the same. If, however, the change-over valve 114 assigned to the front axle brake circuit 13, 32 leaks in its excited position II, the result is that brake fluid can escape from the control pressure chamber 108. Under the influence of the pressure prevailing in the primary output pressure chamber 32, in this case the ring piston 38 is pushed back more and more into its basic position, while the plunger 39 continues to move increasingly in the direction of arrow 116. From the variations in the output signals of the two displacement sensors 117 and 123 characteristic of reverse movements of the ring piston 38 and of the plunger 39 of the primary piston 29, the electronic control unit 22 clearly recognizes that the change-over valve 114 is leaking and generates an indicating or warning signal characteristic of this. This output signal of the electronic control unit 22 can also be used to control the pushing back of the change-over valve 114 into its basic position I.

Two:
Leakage of the change-over valve 113 assigned to the rear axle brake circuit 17, 33 in its basic position II,
With the assumptions stated above under one, a leakage of this change-over valve 113 in its excited position II has the effect that brake fluid tends to escape from the secondary output pressure chamber 33. This causes the secondary piston 31 and the primary piston 29 as a whole (i.e. both its ring piston 38 and also its plunger 39) to move in the direction of arrow 116, and the electronic control unit 22 to recognize clearly from the associated equivalent variation in the output signals of the displacement sensors 117 and 123 the state of leakage of the change-over valve 113 and generate an indicating or warning signal characteristic for this, which in turn can be used to change over the change-over valve 113 into its basic position.

It goes without saying that the monitoring functions described above are only of significance for operating states of the brake system 10 in which the ABS control is activated, and that switching back the change-over valves 113 and 114 to their basic position in the respective brake circuit 17 or 13 dispenses with the ABS function. For further improvement of the functional reliability of the brake system 10, another change-over valve 124 is provided, especially designed as a 2/2-way solenoid valve, in the basic position I of which the annular chamber 86 bounded by the ring piston 38 is communicatingly joined to the reservoir 24 via the compensating branch 84, and in the excited position II of which this annular chamber 86 is blocked from the reservoir 24. This valve-controlled blocking of the annular chamber 86 prevents the ring piston 38 from being able to move back into its basic position, during the course of a braking operation, if there is damage to the ring gasket 49 of its larger piston flange 46 and/or the ring gasket 59 with which the plunger 39 of the primary piston 29 is sealed off in the partition bore 42 of the cylinder casing 36. The above-mentioned case of damage to the ring gaskets 49 and/or 59 can be detected by means of logical association of the stroke signals or position signals of the displacement sensors 117 and 123 and of the pressure sensor 93, which in this conjunction is assumed to be an analogue pressure sensor. The ring gasket damage is reliably determinable by means of these sensors 117 and 123 and also 93. In this case, the electronic control unit 22 generates a trigger signal for the change-over valve 124, whih causes it to switch into the block position II.

The result accomplished is that, in this case of an accumulator failure, an adequately large remaining displacement stroke of the plunger 39 is available in order to achieve an adequate braking of the vehicle, and that the piston can be designed to a low cross-section $F_3$ compared with the cross-sectional area $F_2$ of the tandem master cylinder stage 37 assigned to the front axle brake circuit, which produces a favorably high transmission ratio $F_2/F_3$ upon failure of the power assistance, when only pedal force remains available for generating brake pressures $P_{VA}$ and $P_{HA}$.

The brake system 20, represented in FIG. 2 as a further exemplary embodiment, consists of the basic unit explained in detail with reference to FIG. 1 including the first change-over valve 113 assigned to the rear axle brake circuit 17, 33. In FIG. 2, those elements referenced by numbers identical to those in FIG. 1 perform the same or similar function. In further structural conformity with the brake system 10 according to FIG. 1, the brake system 20 according to FIG. 2 again provides for a displacement sensor 117 for monitoring the position of the ring piston 38 of the primary piston 29 of the tandem master cylinder, and a displacement sensor 123 for directly detecting the position of the brake pedal 66 and for indirectly detecting the positions of the ram plunger 67 and of the plunger 39 of the primary piston 29 of the tandem master cylinder 28.

Structural and operational differences of the brake system 20 compared with the brake system 10 according to FIG. 1 are essentially confined to the configuration and function of a second change-over valve 214 assigned to the front axle brake circuit 13, 32 and the design of the electronic control unit 222. The control unit 222 generates the control output signals used for triggering the change-over valve 113 and 214 from either the processing of the piston position-characteristic output signals of the displacement sensors 117 and 123 or else from the output signals of wheel speed sensors (not shown) generated within the ABS and characteristic of the state of movement of the vehicle wheels. The description of functions of the electronic control units 222 provided within the brake system 20 is again intended to also be regarded as adequate description of their design and can be produced on this basis using conventional means of electronic circuit engineering.

In the case of brake system 20, the primary output pressure chamber 32 of the tandem master cylinder is directly and constantly connected via brake line 26 leading to the brake pressure control valves 18 and 19 of the front axle brake circuits 13, 32.

The second change-over valve 214 is designed as a 4/2-way solenoid valve which is shown in its operative position I associated with the basic position. In this basic position, adopted in the case of normal braking (i.e. without ABS control) the control pressure output 104 of the proportional control valve 94 is connected via a flow path 126 of the second change-over valve 214 to the control pressure chamber 108 of the tandem master cylinder 28. In the excited position II of the second change-over valve 214, the brake line 26, and thus also the primary output pressure chamber 32 of the tandem master cylinder 28, is connected which is via a first flow path 127 to the pressure output 104 of the proportional control valve 94 released in this operative position, and the control pressure chamber 108 is communicatingly joined to the third chamber 83 of the reservoir 24 by means of a return line branch 129 via a second flow path 128 which is released in the excited position of the second change-over valve 214.

In a special design of the electronic control unit 222 of the brake system 20, it is "programmed" to the following operational mode:

With normal braking, the two control valves 113 and 214 remain, at least initially, in their respective basic positions I. It should again be assumed that the displacement sensor 117 monitoring the position of the ring piston 38 and the displacement sensor 123 monitoring the position of the brake pedal 66 each generate a voltage output signal, the level of which rises with increasing displacement of the ring piston 38 or of the plunger 39 of the primary piston 29 in the direction of arrow 116.

If, during the course of braking, the pedal force is increased to such an extent that the level $U_R$ of the displacement sensor 117 monitoring the ring piston position reaches or exceeds a threshold value $U_{RS}$, which corresponds to an advanced position of the ring piston 38 associated with an approximately 80 to 90% utilization of the maximum pedal travel, then the electronic control unit generates control signals by means of which the two change-over vavlves 113 and 214 are controlled into their excited position II. This causes both the wheel brakes 11 and 12 of the front axle brake circuit and also the wheel brakes 14 and 16 of the rear axle brake circuit to be changed over to dynamic pressure admission (i.e. to be connected directly to the pressure output 104 of the proportional control valve 94).

At the same time, the output pressure of the proportional control valve 94 is coupled into the primary output pressure chamber 32 of the tandem master cylinder and the control pressure chamber 108 is pressure-relieved by connection to the return line branch 129 via flow path 128. This pressure admission pushes the primary piston 29 back in the direction of its basic position, the same applying to brake pedal 66. Triggering of the two change-over valves 113 and 214 is not maintained until the primary piston 29 as a whole has reached its basic position again, but only for a short period, that is defined, for example, by drop-delayed time-delay elements provided within the electronic control unit 222, so that the primary piston 29 or the brake pedal 66 is at most pushed back by, for example, 10 to 20% of its maximum travel. By this type of triggering of the change-over valves 113 and 214, the limit of the brake forces achievable in static operation of the two brake circuits 13, 32 and 17, 33 is so to speak set, and it is ensured that an adequate quantity of brake fluid is always enclosed in the output pressure chambers 32 and 33 of the tandem master cylinder 28 to make braking with sufficient minimum deceleration still possible in the event of a failure of the auxiliary pressure source 89, 92 and consequently initiated switching back of the change-over valves 113 and 214 into their basic positions I in static operation of the tandem master cylinder 28 (i.e. just under pedal-power control).

The change-over valve 113 assigned to the rear axle brake circuit 17, 33 is instructed to move to its excited position II if the ABS control is activated during the course of braking, irrespective of whether the ABS control first becomes active on the front axle brake circuit 13 or on the rear axle brake circuit 17. Pressure reduction phases of the ABS control taking place in the rear axle brake circuit 17 can then no longer result in a reduction in the quantity of brake fluid enclosed in the secondary output pressure chamber 33.

Along with the activation of the ABS control, the information characteristic of the momentary position of the brake pedal 66, which is continuously recorded by means of the pedal position sensor 123, is stored in the electronic control unit 222 and subsequently used as a first comparative parameter with which the pedal position information obtained by means of the pedal position sensor 123 is continuously compared. As a second comparative parameter for the pedal position information obtained by means of the pedal position sensor 123, the electronic control unit 222 internally forms a second comparative value which corresponds to a somewhat greater pedal travel compared with the pedal position at which the control was activated, the difference in the two comparative parameters corresponding, for example, to a pedal position change of 5 to 10% of the maximum pedal travel. If a reduction occurs in the quantity of brake fluid enclosed in the primary output pressure chamber 32 as the consequence of a pressure reduction phase of the ABS control, the primary piston 29 is displaced in the direction of arrow 116 and the brake pedal 66 is caused to "yield" in the sense of an enlargement of its pedal travel thus far reached. Thus, said reduction is due to an ABS control cycle on the front axle brake circuit 13, 32, which is still operated with static pressure admission. As soon as the pedal position assumed corresponds to the second larger comparative value stored in the electronic control unit 222, the second change-over valve 214 is also controlled into its excited position II and the front axle brake circuit 13, 32 is thereby also changed over to dynamic operation. The admission to the primary output pressure chamber 32 of the output pressure of the proportional control valve 94, associated with this, and the simultaneous pressure relief of the annular chamber 108 of the tandem master cylinder cause the primary piston 29, and with it the brake pedal 66, to be pushed back again in the direction of their respective basic positions as explained above with reference to a normal braking operation. The triggering of the second change-over valve 214 is cancelled again, as soon as the pedal position again corresponds to the first comparative value which characterizes the momentary position of the brake pedal 66 upon activation of the ABS control.

As long as the ABS control is activated, pressure reduction phases taking place in the front axle brake circuit 13, 32 initiate pulsating movements of the brake pedal 66, which signal obviously to the driver that the control is in operation. In this process, the primary output pressure 32 of the tandem master cylinder 28 is replenished within each and every control cycle with as much brake fluid as has been drained off in a preceding pressure reduction phase. Thus, minimum quantities of brake fluid remain enclosed both in the primary output pressure chamber 32 and in the secondary output pressure chamber 33 of the tandem master cylinder 28. Static braking is thereby made possible with sufficient brake deceleration should the auxiliary pressure source 89, 92 fail.

The threshold values used for the appropriate triggering of the second change-over valve 214 are each cancelled again at the end of an ABS control phase and when the brake pedal 66 is in the direct vicinity of its release position.

If, during the course of an ABS control phase, a leak occurs in the primary circuit 13, 32 of the tandem master cylinder, with the consequence that the accumulator 92 must constantly be recharged, the leak is detected by the response of the float-operated switch 112 assigned to the third chamber 83 of the reservoir 24 and by the response of the pressure switch 93 monitoring the accumulator pressure to cause the triggering of the second change-over valve 214 to be cancelled. This causes further emptying of the pressure accumulator 92 from the leak to be avoided, in which case the pressure accumulator 92 can again be charged to its normal output pressure by the remaining quantity of brake fluid contained in the chamber 83. The power assistance continues to be available for the secondary brake circuit 17, 33 of the tandem master cylinder 28, which remains operational in this case, and the ABS control function can also still be maintained on this brake circuit.

Various pedal force pedal travel characteristics can be obtained by specifying various comparative parameter differences for ABS control operation and by appropriate programming of the electronic control unit. A driver can use these pedal travel characteristics to reliably recognize the particular operational state of the brake system 20. In order to achieve the control functions explained above, in principle it suffices if only one displacement sensor 117 or 123 is provided, which generates an output signal monotonously correlated with the piston displacement or the pedal travel. However, redundant use of two, mutually independent displacement sensors 117 and 123 is expedient for safety reasons.

Also in the case of brake system 30 according to the invention, represented in FIG. 3 as a further exemplary embodiment, the electro-hydraulic basic unit is again provided, the design and operation of which have already been explained in detail with reference to FIGS. 1 and 2. The electro-hydraulic basic unit comprises a power-assisted tandem master cylinder 28, the pressure accumulator 92 with accumulator charge device, the proportional control valve 94, the first change-over valve 113, and the hydraulic control element 18, 19, 23 of the ABS.

The brake system 30 essentially differs from those described with reference to FIGS. 1 and 2 in that the ABS control on the front axle brake circuit 13, 32 operates on the return feed principle, with which, if the control responds, the amount of brake fluid pumped back into the primary output pressure chamber 32 of the tandem master cylinder is exactly the same as that drained off from the control wheel brake cylinder or cylinders in a pressure reduction control phase of the ABS control. Together with the change-over of the rear axle brake circuit 17, 33 to dynamic operation, which is provided for ABS control operation, this all ensures again that there is always an adequate quantity of brake fluid for emergency braking contained in the output pressure chambers 32 and 33 of the tandem master cylinder.

The structural differences from the brake systems 10 and 20 described above, due to this operational mode of the brake system 30, are as follows. Provision is made for a brake fluid accumulator 131 designed as a low-pressure accumulator and integrated in the casing 36 of the tandem master cylinder. The brake fluid accumulator 131 is capable of taking up brake fluid drained off from the front axle brake circuit 13 in a pressure reduction phase of the ABS control, in the sense of an intermediate accumulation, before it is pumped back into the primary output pressure chamber 32 of the tandem master cylinder 28.

The hydraulic pump 389, used for charging the pressure accumulator 92, is designed as a dual circuit pump, the first circuit 89' of which, as described with reference to FIG. 1, is employed for charging the pressure accumulator, and the second circuit 89" of which is used as a return feed pump for pumping back the brake fluid taken up by the brake fluid intermediate accumulator 131 into the primary output pressure chamber 32 of the tandem master cylinder. An example of the pump used as dual circuit pump 389 is the electrically driven free piston return feed pump provided in a conventional ABS operating on the return feed principle. Triggered by the output pressure of the pressure accumulator 92, a change-over valve 132 provided within the accumulator charge circuit 89', 91, 92, merely has the purpose of releasing a flow path. The first circuit 89' of the pump 389 is directly connected to the third chamber 83 of the reservoir 24 via said flow path when the pressure accumulator 92 is charged so that the pump does not have to work against a high back pressure in its first output circuit 89'.

The special configuration of the electronic control unit 322, provided as a functional adaptation within the scope of brake system 30, is again intended to be outlined by the relevant functional data.

Advantageous operational features characteristic of the brake system 30 include at least the following. In the event of a failure of the pressure accumulator, the control output of the electronic control unit 322, via which the change-over valve 113 can be triggered, is blocked, so that the valve drops back into its illustrated basic position if it has been triggered. Failure of the pressure accumulator is detectable by means of an output signal of the pressure switch 93 characterizing such a failure and/or by means of the response of the float-operated switch 112 to the dropping of the brake fluid level in the third chamber 83 of the reservoir 24 assigned to the accumulator charge circuit. Although the power assistance is now lost, brake pressure can nevertheless still be built up to a sufficient extent in both brake circuits 13, 32 and 17, 33 by means of pedal-control displacement of the plunger 39 of the primary piston 29. Assuming that the return feed pump 389 is in operational condition, the ABS control function is fully retained on the front axle brake circuit 13, 32 and even on the rear axle brake circuit 13, 33, with the restriction that although brake pressure can still be maintained and reduced it can no longer be built up. A blocking of the rear axle never occurs although during the course of some pressure reduction control cycles, the secondary piston 31 of the tandem master cylinder does come into contact with its face wall 53, with the result that no increase in the braking effect in the rear axle brake circuit 17, 33 can be achieved any longer.

In the event of a failure of the front axle brake circuit brake pressure can still be built up with power assistance via the rear axle brake circuit. Such a failure is detectable by means of the output signal of the float-operated switch 109 which responds to a dropping of the brake fluid level in the chamber 78 of the reservoir 24 assigned to the front axle brake circuit. The ABS control function for the rear axle brake circuit 19, 33 is retained.

In the event of a failure of the rear axle brake circuit 17, 33 again the control output of the electronic control unit 322, via which the control valve 113 can be triggered, is blocked, so that the latter remains in its basic position or drops back into this position. Such a failure is detectable by the response of the float-operated switch 111 which monitors the brake fluid level in the second chamber 82 of the reservoir 24 assigned to the rear axle brake circuit. The power assistance remains active for the front axle brake circuit 13, 32, as does the ABS control.

The possibility of a failure of the dual circuit pump 389 can, alternatively, be taken into account as follows within brake system 30, depending on whether preference is given in this case to a limited maintenance of the ABS control function of the power assistance. It must of course be assumed here that a safety circuit monitoring the operation of pump 389 is available which generates a malfunction-indicating signal characteristic of pump failure.

One:

In the event of a failure of pump 389, the change-over valve 113 is instructed to move to its excited position. In this case, the ABS control function can be maintained on the rear axle until the pressure accumulator 92 is exhausted. The same applies to the power assistance.

Two:

In the event of a malfunction of pump 389, the change-over valve 113 is instructed to move to its basic position. In this case (foregoing the ABS pressure build-up function, but maintaining the ABS pressure reduction function in the secondary brake circuit 17 on the rear axle), it is possible to brake with effective power assistance for a relatively long time, as the "pressure consumption" in the proportional control valve 94 is still small. Due to the failure of pump 389, the ABS pressure build-up function is of course also lost in the primary brake circuit 13 (on the front axle), and the ABS pressure reduction function is limited by the take-up capacity of the intermediate accumulator 131.

The brake system 40, represented in FIG. 4, has a further exemplary embodiment, is completely analogous with regard to its basic structure and its operational characteristics to the brake system 30 according to FIG. 3. In FIG. 4, those elements referenced by numbers identical to those in FIG. 3 perform the same or similar function. The only structural details in which the brake system 40 according to FIG. 4 differs from the brake system 30 according to FIG. 3 are as follows.

The same design is again intended for the auxiliary pressure source 89, 92 as explained with reference to FIG. 1. The front axle brake circuit 13, 32 is controlled in ABS control operation on the return feed principle. The return feed pump returns brake fluid taken up by the intermediate accumulator 131 from the front axle brake circuit 13 in a pressure reduction control phase into the primary output pressure chamber 32 of the tandem master cylinder 28 and is a specially designed piston pump 489 which is integrated in the casing 36 of the tandem master cylinder in a space-saving arrangement. The working chamber 133, acting both as intake and as output pressure chamber, is connected to the pressure accumulator 131 via a non-return valve 134. The valve 134 is operated in the opening direction by relatively higher pressure in the brake fluid accumulator 131 and operated in the blocking direction by relatively higher pressure in the working chamber 133. The non-return valve 134 is connected to the primary output pressure chamber 32 of the tandem master cylinder via a non-return valve 136 which is operated in the opening direction by high pressure in the working chamber 133 of the piston valve 489 and operated in the blocking direction by relatively higher pressure in said primary output pressure chamber. The drive of the pump piston 137 is effected by means of a piston 138, the working chamber of which 139 alternately admits the high output pressure of the pressure accumulator 92 by means of a periodically reversed change-over valve 142, or is joined to the reservoir 24 which is at low ambient pressure. The compensating chamber 141 of the drive piston 138 is connected to the reservoir 24 opposite the working chamber 139.

The periodic reversal of the change-over valve 142 can be effected, for example, by means of a mechanically driven eccentric, the drive of which is taken from the vehicle engine. Alternatively, the change-over valve 142 can be designed as a periodically actuatable solenoid valve.

The particular advantage of using a piston pump 489 as the return feed pump is that the output pressure of any pressure source available on the vehicle can be utilized to drive the pump, provided its output pressure is at sufficiently high a level. A favorable aspect of this is that practically only a single pressure line has to be led from this auxiliary pressure source to the change-over valve 142 controlling the operation of the return feed pump 489.

Although the invention has been described in detail with reference to certain preferred embodiments and specific examples, variations and modifications exist within the scope and spirit of the invention as described and defined in the following claims.

What is claimed is:

1. In a combination hydraulic dual circuit brake system and anti-locking brake system that is of the type having a tandem master cylinder for controlling two vehicle brake circuits and including a plurality of output pressure chambers and a primary piston mounted for movement in the cylinder to produce a brake pressure buildup in at least one of the output pressure chambers and to define a working area, an auxiliary pressure source for providing an auxiliary output pressure at a predetermined level, and a proportional control valve means for supplying a control output pressure proportional to a force applied to a vehicle brake pedal, the proportional control valve means including a supply pressure input in fluid communication with the auxiliary pressure source and formed to include a pressure output, the control output pressure being usable to impinge the working area of the primary piston, wherein the improvement comprises the tandem master cylinder includes a cylinder casing and is formed to include, in serial order, a secondary pressure bore stage, a primary pressure bore stage, a pre-pressure chamber, an auxiliary pressure bore stage, the primary piston includes a ring piston formed to include a central bore and a plunger mounted for movement in said central bore, the ring piston and the primary pressure bore stage cooperating to define a primary pressure output chamber, the ring piston including a first ring flange arranged in a pressure-tight displaceable manner in the primary pressure bore stage, a second ring flange axially spaced in relation to the first ring flange, and arranged in a pressure-tight displaceable manner in the auxiliary pressure bore stage, and a sleeve-shaped adaptor extending therebetween for joining the first and second ring flanges, the plunger including a driving flange in communication with the primary pressure chamber and biased against the first ring flange of the ring, the cylinder casing includes a partition between the auxiliary pressure bore stage and the pre-pressure chamber, the partition, second ring flange, and cylinder casing cooperating to define an annular control pressure chamber, the partition being formed to include a bore through which the plunger is displaceable in a pressure-tight manner, plunger means, responsive to actuation of the brake pedal, for generating a pressure in pre-pressure chamber for use as a reference pressure by the proportional control valve means, means for coupling the control output pressure of the proportional control valve means to the annular control pressure chamber, and means for activating the pressure control valve means of the anti-locking system to introduce the control pressure into the control pressure chamber to cause the control pressure to impinge the working surface of the primary piston, whereby a secondary brake circuit is changed over to dynamic pressure admission from static pressure admission by the control output pressure and a brake line for fluidly coupling the secondary pressure bore stage of the tandem master cylinder and the wheel brakes of the secondary brake circuit is blocked to disable static operation of said wheel brakes during operation of said anti-locking system.

2. The apparatus of claim 1, wherein the anti-locking system activating means includes a first changeover valve having a basic position (17) pressure admission to dynamic pressure admission by blocking the static brake line (27) to disable static operation of the wheel brakes, and a control unit for controlling the position of the first changeover valve via a first valve controlling output signal.

3. The apparatus of claim 2, wherein the anti-locking system activating means further includes a second changeover valve having a basic position (I) in which the anti-locking system is not activated and an operative position (II) in which the anti-locking brake system is activated to use said control output pressure to control operation of the primary brake circuit so that said primary brake circuit is changed over from static pressure admission to dynamic pressure admission by blocking the static brake line to disable static operation of wheel brakes during operation of the anti-locking system, and the control unit controls the position of the second changeover valve via a second valve controlling output signal.

4. The apparatus of claim 3, wherein the second changeover valve is a 4/2-way solenoid valve, the control output pressure of the proportional control valve means is coupled to the control pressure chamber via a first flow path of the changeover valve when the second changeover valve is in one of its basic and operative positions and the primary pressure output chamber is coupled to the primary brake circuit via a second flow path defined by the brake line when the second changeover valve is in its operative position (II).

5. The apparatus of claim 3, wherein the primary output pressure chamber is coupled to the primary brake circuit via the brake line, the second changeover valve is a 4/2-way solenoid valve, the control chamber is coupled only to the control pressure output of the proportional control valve means to block intercommunication of the primary output pressure chamber and the proportional control valve when the second changeover valve is in its basic position (I), and the control chamber is coupled to a brake fluid reservoir and the primary output chamber is coupled to the pressure output of the proportional control valve when the second changeover valve is in its operative position.

6. The apparatus of claim 2, wherein the changeover of the first solenoid valve into its operative position (II) is controllable by means of a signal of the electronic control unit to indicate that the anti-locking system has become active to control the operation of the primary brake circuit.

7. The apparatus of claim 3, wherein the second changeover valve is triggered with a predetermined time delay relative to the triggering of the first changeover valve.

8. The apparatus of claim 3, further comprising at least one stroke sensor means for generating an output signal that is proportional to a displacement stroke of the primary position and that is comparable with a comparison output signal of a threshold value that represents a maximum permissible displacement stroke of the primary piston to cause the electronic control unit to generate a trigger signal for the changeover of at least the second changeover valve.

9. The apparatus of claim 8, wherein the comparison output signal of the electronic control unit instructs both the first solenoid valve and the second solenoid valve to move to their operative positions (II).

10. The apparatus of claim 8, wherein the first stroke sensor generates an output signal proportional to the displacement stroke of the ring piston of the primary piston.

11. The apparatus of claim 8, further comprising a second stroke sensor for generating an output signal which is a measure of the brake pedal travel reached in braking and the displacement stroke of the plunger of the primary piston.

12. The apparatus of claim 11, wherein the electronic control unit further includes means for comparatively processing the output signals of the stroke sensors to provide a safety valve output signal characteristic for the momentary positions of the ring piston and of the plunger of the primary piston with values of one of the piston positions and the output signal of a pressure sensor monitoring the pressure of an accumulator and that is characteristic of the momentary positions of the said ring piston and primary piston plunger upon activation of the anti-locking system, the safety valve output signal indicating retraction movements of at least one of the ring piston, and the plunger, and a pressure drop in the accumulator, and further comprising an electrically triggerable changeover valve which is controlled by means of this output signal of the electronic control unit into its blocking position (86) (44 and 46) (38) (36) (86) (24) (124).

13. The apparatus of claim 1, wherein a pressure accumulator is connected to a return line of the brake circuit connected to the primary output pressure chamber of the tandem master cylinder, and further comprising a return feed pump for returning the brake fluid taken up by an accumulator in pressure-reducing phases of the anti-locking brake system to the primary output pressure chamber of the tandem master cylinder.

14. The apparatus of claim 13, wherein one output circuit of a dual circuit return feed pump is used as return feed pump for the primary circuit of the brake system, and a high-pressure accumulator of the auxiliary pressure source is chargeable via its second output circuit.

15. The apparatus of claim 13, further comprising a hydraulically driven return feed pump which is driven by means of a piston, the return feed pump formed to include a working pressure chamber for receiving the alternating admission of the output pressure of an auxiliary pressure source existing in the vehicle by means of periodic actuation of a changeover valve.

16. The apparatus of claim 11, wherein the electronic control unit in response to activation of the anti-locking system stores as a first comparative quantity a parameter characteristic of the related momentary position of the brake pedal detected by means of one of a first and a second stroke sensor, the control unit forms a second comparative quantity corresponding to a pedal travel greater by approximately 5 to 10% of the maximum brake pedal travel than the pedal travel completed up until activation of the anti-locking system and associated with the first comparative quantity, the electronic control unit generates a control output signal by means of which the second changeover valve is controlled into its excited position (II), and interrupts the generation of this control output signal again as soon as the output signal of the stroke sensor again reaches the level corresponding to the first comparative quantity characteristic of the momentary position of brake pedal in the course of the retraction movement of the brake pedal taking place in dynamic operation of the primary brake circuit, if the output signal of the stroke sensor reaches the level corresponding to the second comparative quantity in the course of operation of the anti-locking system or the output signal of the first stroke sensor associated with a maximum piston advance is generated.

17. A vehicle brake system comprising master cylinder means for manually controlling the actuation of at least one vehicle wheel brake, the master cylinder means being formed to include an output pressure chamber and a brake actuation chamber, means for coupling the output pressure chamber to the at least one vehicle wheel brake so that said brake is actuated whenever the pressure in the output chamber exceeds a predetermined threshold level, piston means in the master cylinder means for regulating the pressure in the output chamber, auxiliary means responsive to the pressure in the brake actuation chamber for regulating the pressure in the output pressure chamber, brake pedal means for activating at least one of the auxiliary means and the piston means, the brake pedal means including plunger means for regulating the pressure in the brake actuation chamber to cause the piston means to increase the pressure in the output chamber to a pressure in excess of the predetermined threshold level to provide brake power and to permit the auxiliary means to further increase the pressure in the output pressure chamber in proportion to a force applied to the brake pedal means by a vehicle operator to provide additional brake power in certain situations and for impinging the piston means when the force applied to the brake pedal means by the vehicle operator exceeds a selected threshold safety level to provide additional brake power during a failure of the auxiliary means, wherein the auxiliary means includes an auxiliary pressure chamber, means for pressurizing the auxiliary pressure chamber, and control valve means responsive to the brake pedal means for regulating the pressure in the auxiliary pressure chamber, and further comprising an anti-locking brake means for automatically controlling the actuation of at least one vehicle wheel brake, the anti-locking brake means including means for coupling the auxiliary pressure chamber to at least one vehicle brake so that said brake is actuated whenever the pressure in the auxiliary pressure chamber exceeds the predetermined threshold level, and mode selector means for selectively actuating one of the master cylinder means and the anti-locking brake means, the mode selector means having a basic position (I) in which the output pressure chamber is coupled to the vehicle brakes and the anti-locking brake means is disabled and an operating position (II) in which the auxiliary pressure chamber is coupled to the vehicle brakes and the master cylinder means is disabled, and a master control unit for controlling the position of the mode selector means.

18. A hydraulic brake system for a vehicle comprising;

an auxiliary pressure source;

master cylinder means including an output pressure chamber, a piston means for regulating the said output chamber, input means independent of said auxiliary pressure source for hydraulically multiplying an input force from a brake pedal and applying said multiplied force to said piston means;

proportional control valve means for supplying an auxiliary signal from at least said auxiliary pressure source proportional to said input force;

power assistance means fluidically independent of said input means and responsive to said auxiliary signal for assisting said piston means in regulating the pressure in said output chamber;

means for coupling said output pressure chamber to wheel brake; and anti-locking brake means for providing anti-locking control signals, and switch-over means responsive to said anti-locking control signal for disconnecting said output chamber and connecting said auxiliary signal to said coupling means.

19. A system according to claim 18, wherein said means for coupling said output pressure to wheel brakes includes at least two distinct circuits, one distinct circuit communicating with a front axle and another distinct circuit communicating with a rear axle.

20. A system according to claim 18, wherein said master cylinder means is a stepped type master cylinder.

21. A system according to claim 20, wherein said stepped type master cylinder comprising at least two steps, a primary bore stage having a greater diameter than other stages.

22. A system according to claim 19, wherein said master cylinder means includes a plurality of output pressure chambers, a primary output pressure chamber, having the largest force, communicating with said front axle through said one distinct circuit.

* * * * *